United States Patent [19]

Kujas

[11] Patent Number: 4,739,920

[45] Date of Patent: Apr. 26, 1988

[54] SOLDERING PROCESS

[75] Inventor: Erich F. Kujas, Philadelphia, Pa.

[73] Assignee: RCA Corporation, Princeton, N.J.

[21] Appl. No.: 93,078

[22] Filed: Sep. 3, 1987

Related U.S. Application Data

[63] Continuation of Ser. No. 842,357, Mar. 19, 1986, abandoned, and Ser. No. 603,291, Apr. 23, 1984, abandoned.

[51] Int. Cl.$^4$ .......................... B23K 1/20; B23K 31/02
[52] U.S. Cl. ..................................... 228/207; 228/223; 228/263.17
[58] Field of Search ............ 228/183, 223, 207, 263.17

[56] References Cited

U.S. PATENT DOCUMENTS

| | | | |
|---|---|---|---|
| 2,052,740 | 9/1936 | Barber et al. | 228/205 |
| 3,259,973 | 7/1966 | Quass et al. | 228/263.17 |
| 3,294,526 | 12/1966 | Koeplinger | 228/263.17 |
| 3,305,407 | 2/1967 | Koeplinger | 228/263.17 |
| 4,153,195 | 5/1979 | Barozzi et al. | 228/183 |
| 4,298,407 | 11/1981 | Taylor | 228/223 |
| 4,613,069 | 9/1986 | Falke et al. | 228/263.17 |

FOREIGN PATENT DOCUMENTS 2539659  3/1977  Fed. Rep. of Germany ...... 228/206

OTHER PUBLICATIONS

Manko, H. H., "Solders and Soldering," McGraw-Hill Book Company, pp. 281-285, 293.

Metals Handbook, 8th Edition, vol. 8, p. 261, 1973.

*Primary Examiner*—Nicholas P. Godici
*Assistant Examiner*—Samuel M. Heinrich
*Attorney, Agent, or Firm*—Birgit E. Morris

[57] ABSTRACT

A long chain organic acid, such as stearic acid, is used as a flux to bond aluminum to electro-deposited sheet of aluminum, magnesium, or alloys thereof.

6 Claims, No Drawings

SOLDERING PROCESS

This is a continuation of Ser. No. 842,357, filed 3/19/86, now abandoned, and of Ser. No. 603,291 filed 4/23/84 now abandoned.

This invention relates to a flux which provides improved bond strengths to soldered aluminum and magnesium bonds.

BACKGROUND OF THE INVENTION

Soldering is a well-developed art which is widely used to join various metals to each other. Many solders are available commercially, many of them combinations of low-melting metals such as tin and lead. Metal solder, generally available in wire form, is melted and applied over the two metals to be joined. When the solder cools, it solidifies, encapsulating the joint. In order to provide a good bond, the solder must adhere well to both of the joined surfaces. This requires that the metal surfaces to be joined must be clean and that the solder will wet the surfaces of both metals well. Fluxes are often used during the soldering process to clean the metal surfaces and to improve surface wetting by the molten solder. In fact many commercial solders includs a flux core. Fluxes usually include organic resins, organic acids or salts or inorganic acids and salts. During bonding, the flux first displaces air and moisture on the surface to be bonded, i.e., wets the surface, and then removes any surface tarnish or oxide from the surface of the metal. This can be done by a chemical reaction, such as reducing the surface oxide back to metal, or by dissolving the surface oxide. The solder then displaces the flux on the surface and surrounds the joint.

Solder bonding for metals produced by electrolysis, such as aluminum and magnesium, has several problems. Aluminum forms a comparatively thick, tenacious oxide coating on its surface immediately upon exposure to air or oxygen which is very difficult to remove with conventional fluxes. Thus special fluxes are often used, such as organic fluorides, often combined with heat-stable salts such as cadmium fluoroborate, metal fluorides, inorganic chloride and ammonium compounds. These fluxes are very corrosive, however, and they are temperature-sensitive. Zinc chloride or tin chloride are also used as fluxes for aluminum, but the temperature of use must be carefully controlled.

Another problem with soldering both aluminum and magnesium is their high electromotive potential relative to that of most solders. This difference in potential leads to severe corrosion of the joint when exposed to moisture in the atmosphere and results in failure of the soldered joint.

However, it is highly desirable to use magnesium and aluminum metals and their alloys for applications in space due to their light weight. For example, eliminating one pound in the manufacture of a satellite reduces the power requirements of the spacecraft by a significant amount. Up until now the use of aluminum or magnesium sheet to which a plurality, sometimes hundreds, of soldered wire bonds must be made, has not been feasible because of the poor bond strengths obtained. In general bond strengths of over 10 pounds, preferably over 20 pounds, are required for these applications.

SUMMARY OF THE INVENTION

I have found that aluminum can be soldered to aluminum, magnesium and alloys thereof using conventional tin or lead solders when a long-chain organic acid is employed as a flux prior to soldering.

DETAILED DESCRIPTION OF THE INVENTION

Long-chain alkyl organic acids useful as a flux for aluminum soldering according to the invention include stearic acid, palmitic acid, oleic acid or mixtures thereof. For example, commercial stearic acid is actually a mixture containing 50 percent by weight of stearic acid, 45 percent by weight of palmitic acid and 5 percent by weight of oleic acid. Pure stearic acid, or n-octadecanoic acid, is preferred.

The organic acid can be applied in solid or crystalline form directly to the surface of the aluminum or magnesium to be soldered, or it can be mixed with a suitable solvent, such as an alcohol, ether, chloroform, carbon tetrachloride and the like, to form a solution or paste. Conveniently the acid crystals can be dissolved in an alcohol and the solvent allowed to dry in a mold so as to form a stick or wire of the acid, for ease of handling. The use of these materials has the added advantage that they are odorless, colorless, non-toxic, and, importantly, they have relatively low melt temperatures.

The above fluxes can be applied just prior to soldering aluminum onto aluminum, magnesium or alloys thereof. The part to be soldered can be in the form of electro-deposited sheet, wire and the like. The wire or other metal part to be bonded to it is contacted to the aluminum or magnesium using a conventional solder gun or other heat source such as an infrared lamp to melt the flux and the solder and to apply the solder to the part to be bonded. Upon cooling, a strong bond is obtained. Suitable solders include lead-tin, lead-tin-silver solders, silver and silver-indium alloys.

The invention will be illustrated by the following Example, but it is not meant to be limited to the details described therein. In the Examples, percent is by weight.

EXAMPLE 1

Four electro-deposited metal sheets 2"×6"×0.25" (5.1×15.2×0.6 cm) were provided, Sample A, type 1100, of 100 percent aluminum; Sample B, type AE31B, of 100 percent magnesium; Sample C of 80-percent-magnesium/20-percent-aluminum alloy, type 20/24; and Sample D of 10-percent-magnesium/90-percent-aluminum alloy, type 20/61. Twenty gauge first aluminum wires were soldered to the samples using commercially available stearic acid crystals containing 50 percent of stearic acid, 45 percent of palmitic acid and 5 percent of oleic acid as a flux.

A second 20 gauge aluminum wire was soldered to each sample by applying a slurry of the stearic acid in ethanol.

A third 20 gauge aluminum wire was soldered to each sample using a commercial solder containing a resin core, type S-44, available from the Kester Company, as a control. The solder contained 62 percent of lead, 36 percent of tin and 2 percent of silver.

The first two soldering procedures using the stearic acid flux produced even spreading of the solder and a clean, strong bond. The commercial solder control produced no bonding whatsoever, the solder merely sliding away on the metal surface.

The strength of the bonds was tested in a CRE-500 pulltester available from the Scott Company which pulls the soldered wire in predetermined directions. Table I below sets forth the pullstrength in pounds of the first wires at various deflections of the wire from the parallel direction.

TABLE I

| Deflection of wire,° | Sample A - to wire Pullstrength, lbs. | Sample B - to wire Pullstrength, lbs. | Sample C - to wire Pullstrength, lbs. | Sample D - to wire Pullstrength, lbs. |
| --- | --- | --- | --- | --- |
| 10 | 22.5 | 25 | 27.5 | 26 |
| 60 | 37 | 38.5 | 41.5 | 39 |
| 90 | 57 | 58 | 62 | 60 |
| 180 | 56 | 59 | 63 | 61 |

Thus all of the substrates attained at least 20 pounds of pullstrength. Similar results were attained for the second wires.

Commercially available solders using a resin core flux did not produce any bonds at all using this test.

EXAMPLE 2

The procedure of Example 1 was followed except using a solder, type 44 core, containing 63 percent of tin and 37 percent of lead. The results are given in Table II:

TABLE II

| Deflection of wire,° | Sample A - to wire Pullstrength, lbs. | Sample B - to wire Pullstrength, lbs. | Sample C - to wire Pullstrength, lbs. | Sample D - to wire Pullstrength, lbs. |
| --- | --- | --- | --- | --- |
| 10 | 23.5 | 26 | 29 | 28.5 |
| 60 | 38 | 39 | 43 | 41 |
| 90 | 58 | 59 | 64 | 61.5 |
| 180 | 57 | 60.5 | 65 | 63 |

Again, all of the substrates attained at least 20 pounds of pullstrength.

I claim:

1. A method of soldering aluminum to untreated electro-deposited sheet of a metal selected from the group consisting of aluminum, magnesium, or alloys thereof, which consists essentially of applying directly to the metal a flux consisting essentially of a solid long chain organic acid, and then soldering.

2. A method according to claim 1 wherein the organic acid is selected from the group consisting of stearic, palmitic and oleic acids and mixtures thereof.

3. A method according to claim 2 wherein the acid is commercial stearic acid.

4. A method according to claim 2 wherein the acid is stearic acid.

5. A method according to claim 1 wherein the solder is selected from the group consisting of mixtures of lead and tin or lead, tin and silver.

6. A method of soldering aluminum to untreated electro-deposited sheet of magnesium metal or an alloy thereof which comprises applying to the metal a flux consisting essentially of a long chain organic acid, and then soldering.

* * * * *